United States Patent

Rüter

[11] 4,345,066
[45] Aug. 17, 1982

[54] TRANSPARENT COPOLYAMIDES AND THEIR APPLICATION TO TRANSPARENT, IMPACT RESISTANT MOLDED ARTICLES

[75] Inventor: Jörn Rüter, Marl, Fed. Rep. of Germany

[73] Assignee: Chemische Werke Hüls AG, Marl, Fed. Rep. of Germany

[21] Appl. No.: 181,413

[22] Filed: Aug. 26, 1980

[30] Foreign Application Priority Data

Sep. 12, 1979 [DE] Fed. Rep. of Germany ....... 2936759

[51] Int. Cl.$^3$ .................. C08G 69/02; C08G 69/26
[52] U.S. Cl. ................................ 528/324; 528/310; 528/326; 528/330; 528/331
[58] Field of Search ............... 528/324, 326, 330, 331

[56] References Cited

U.S. PATENT DOCUMENTS

| | | | |
|---|---|---|---|
| 3,352,942 | 11/1967 | Schmitt et al. | 528/324 |
| 3,627,736 | 12/1971 | Raum | 260/78 R |
| 3,847,877 | 11/1974 | Nielinger et al. | 528/324 |
| 4,101,524 | 7/1978 | Burzin | 528/288 |
| 4,207,411 | 6/1980 | Shue | 528/324 |
| 4,232,145 | 11/1980 | Schmid et al. | 528/324 |

FOREIGN PATENT DOCUMENTS

| | | |
|---|---|---|
| 804088 | 1/1969 | Canada . |
| 1132039 | 10/1968 | United Kingdom . |
| 1228761 | 4/1971 | United Kingdom . |
| 1255483 | 12/1971 | United Kingdom . |
| 1266864 | 3/1972 | United Kingdom . |
| 1410006 | 10/1975 | United Kingdom . |
| 1410007 | 10/1975 | United Kingdom . |
| 619706 | 3/1979 | United Kingdom . |

*Primary Examiner*—Harold D. Anderson
*Attorney, Agent, or Firm*—Wells & Wells

[57] ABSTRACT

Transparent, high molecular-weight copolyamides having high glass transition temperatures, based on:
(1) lactams or omega-aminocarboxylic acids;
(2) terephthalic acid, isophthalic acid, esters thereof, ester forming derivatives thereof, or mixtures thereof; and
(3) mixtures of diamines; the copolyamide consisting of:
  (A) about 25 to 60 mole % of at least one omega-aminocarboxylic acid having at least 11 C atoms or its lactams;
  (B) about 40 to 75 mole % of an equivalent mixture of terephthalic acid, isophthalic acid or a mixture thereof, and a diamine mixture of about 80 to 50 mole % referred to the total diamines, of isophorone diamine and correspondingly about 20 to 50 mole % of diamines of the general formula

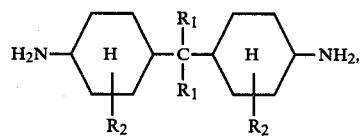

where $R_1$ and $R_2$ are hydrogen atoms or alkyl groups having 1 to 4 C atoms and the sum of A+B amounts to 100 mole %.

The copolyamides have utility as transparent, impact resistant molded articles.

8 Claims, No Drawings

TRANSPARENT COPOLYAMIDES AND THEIR APPLICATION TO TRANSPARENT, IMPACT RESISTANT MOLDED ARTICLES

CROSS-REFERENCE TO A RELATED APPLICATION

Applicant claims priority under 35 USC 119 for application P 29 36 759.7, filed Sept. 12, 1979 in the Patent Office of the Federal Republic of Germany.

BACKGROUND OF THE INVENTION

The field of the invention is copolyamides of omega-aminocarboyxlic acids or lactams thereof with terephthalic acid or isophthalic acid and a diamine. The invention is particularly concerned with copolyamides of terephthalic acid and/or isophthalic acid or their esters or ester-forming derivatives and of diamine mixtures of isophorone diamine and bis-(4-aminocyclohexyl)-methane or derivatives thereof and omega-aminocarboxylic acids or lactams thereof having at least 11 C atoms.

Kirk-Othmer, "Encyclopedia of Chemical Technology", Vol. 16 (1968) discloses on pages 88–105 Polyamide Plastics and their types, processing, machining, finishing and assembly and the state of the art of copolyamides of lactams, dicarboxylic acids and diamines is disclosed in U.S. Pat. No. 3,627,736; French Pat. No. 1,471,798; Canadian Pat. No. 804,088; and British Pat. Nos. 1,132,039; 1,228,761; 1,266,864; 1,255,483; 1,410,006 and 1,410,007, the disclosures of which are incorporated herein. U.S. Pat. No. 4,101,524 is incorporated herein to show the state of the art of methods for preparing colorless polyester amides, the disclosure of which is incorporated herein.

The preparation of the amine raw materials of the present invention having the general formula

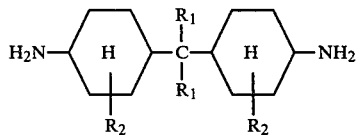

is disclosed in the British Pat. No. 619,706.

Copolyamides of lactam, dicarboxylic acids and diamine mixtures in which isophorone diamine represents one component are known. Thus, French Pat. No. 1,471,798, British Pat. No. 1,132,039 and Canadian Pat. No. 804,088 disclose a copolyamide of aminoundecanoic acid, terephthalic acid and a mixture of diamines of isophorone diamine and dodecamethylenediamine. Such copolyamides however, are not satisfactory since they soften already at temperatures from 70° to 80° C. and hence lack adequate thermal dimensional stability. To achieve proper thermal dimensional stability, the state of the art attempts to minimize the proportion of lactams or aminoundecanoic acid. Thus, U.S. Pat. No. 3,627,736 and British Pat. Nos. 1,228,761; 1,266,864; 1,255,483; 1,410,006; and 1,410,007 disclose that this proportion should not exceed 20 mole % in the copolyamide. While it is possible in this manner to prepare transparent copolyamides with relatively high glass transition temperatures and hence good thermal stabilities, their melt viscosities are very high because of the low lactam or undecanoic acid proportions, whereby processing on conventional machinery is made considerably more difficult. If, however, the lactam proportion is raised to above 20 mole % in the copolyamides prepared in U.S. Pat. No. 3,627,736 and the British patents, a rapid decrease in the glass transition temperature takes place as shown in the comparative examples A and B which follow after the specific examples.

On the other hand, it is known that when isophorone diamine is used as the sole diamine component, copolyamides with high glass transition temperatures are obtained. However, copolyamides of terephthalic acid and/or isophthalic acid, isophorone diamine as the single diamine component and omega-aminocarboxylic acids or lactams having at least 11 C atoms can be condensed only into products of low molecular weights. Such products are brittle and offer no impact strength or notch impact strength as shown in comparative example C which follows the specific examples. These impact and notch impact strengths are determined according to German Industrial Standards DIN 53433 and DIN 54453.

SUMMARY OF THE INVENTION

Having in mind the limitations of the prior art, it is an object of the present invention to develop a transparent copolyamide endowed with a high glass transition temperature in which the proportion in lactams or aminocarboxylic acids having at least 11 C atoms exceeds 20 mole % and of which the proportion of isophorone diamine in the diamine mixture amounts to at least 50 mole % and which provides excellent mechanical properties as characterized by the values of the impact or notch-impact strengths.

This object is achieved according to the present invention using copolyamides consisting of:

(A) about 25 to 60 mole % of at least one aminocarboxylic acid or its lactams having at least 11 C atoms; and (B) about 40 to 75 mole % of an equivalent mixture of terephthalic and/or isophthalic acid and a diamine mixture of about 80 to 50 mole %, referred to the diamines, of isophorone diamine and 20 to 50 mole % of diamines of the general formula:

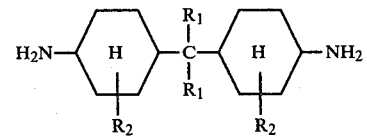

wherein $R_1$ and $R_2$ are hydrogen atoms or alkyl groups having 1 to 4 C atoms, the sum of A+B amounting to 100 mole %. By high glass transition temperature is meant a temperature value of from about 130° C. and higher.

DESCRIPTION OF PREFERRED EMBODIMENTS

The proportion of lactams in component A especially advantageously is from 30 to 50 mole %. Suitable lactams or omega-aminocarboyxlic acids having at least 11 C atoms are aminoundecanoic acid, lauryl lactam, aminododecanoic acid and preferably lauryl lactam.

Obviously, mixtures of these compounds are useful.

The term isophorone diamine defines an isomeric mixture of 3-aminomethyl-3,5,5-trimethylcyclohexylamine. Advantageously, this diamine is used in amounts of 50 to 80 mole % referred to the diamine mixture.

Suitable diamines of the general formula are for instance: bis-(4-aminocyclohexyl)-methane; bis-(4-amino-3-methyl-cyclohexyl)-methane; 2,2-bis-(4-amino-cyclohexyl)-propane and 2,2-bis-(4-aminocyclohexyl)-methane and bis-(4-amino-3-methylcyclohexyl)-methane.

These diamines also are isomeric mixtures, predominantly consisting of trans-trans-, cis-trans-isomers and containing a slight amount of cis-cis isomers.

In the process of the present invention, the isomeric mixtures used are obtained by hydrogenating the corresponding bis-(4-amino-aryl)-alkanes as disclosed in the British Pat. No. 619,706.

The diamines of the general formula advantageously are used in amounts of 20 to 50 mole % referred to the total number of moles of the diamines.

The preparation of the copolyamides is carried out by the conventional process for copolyamides. Ordinarily, the procedure is such that the mixture of the initial components is heated in the presence of 10 to 30% by weight of water in a closed autoclave to temperatures between 190° and 230° C., with precondensation taking place. Upon completion of this precondensation, the temperature is raised to 250° to 300° C., and complete polycondensation takes place after the autoclave is decompressed and nitrogen is made to pass through. The final phase of the polycondensation is conventionally carried out under vacuum, but this is in no way required.

Acid catalysts in concentrations of 0.01 to 1% by weight, preferably 0.05 to 0.5% by weight, referred to the total mixture, are used to accelerate the polycondensation reaction. The preferred catalysts are phosphoric acid and hypophosphorous acid.

Appropriately, the entire polycondensation is carried out with stirring to ensure homogeneous mixing of the individual components and to facilitate the removal of the water of condensation.

Salts from the aromatic dicarboxylic acids and of the individual components of the diamine mixture may be used but need not be used, and as a rule, the free dicarboxylic acids and the free diamines are used.

In view of the higher volatility of the diamine mixture with respect to the aromatic dicarboxylic acids, it was found practical to use a slight excess of the diamine mixture with respect to the portion of dicarboxylic acid. Ordinarily, an excess of about 0.5 to 3 mole % referred to the portion of total diamines is used.

The molecular weight of the copolyamides of the present invention can be controlled by means of carboxylic acids or amines. The relative solution viscosity is an index of the numerical value of the molecular weight and it is ascertained in a 0.5% solution of the copolyamides of the invention to m-cresol at 25° C. The relative solution viscosity value of the copolyamides of the invention should be in excess of 1.4, and preferably between about 1.5 and 1.8.

Conventional additives such as anti-oxidants, flame-proofing means, ultraviolet stabilizers, thermal stabilizers or pigments may be added to the copolyamides of the invention as disclosed in Kirk-Othmer, ibid., pp. 92–95, and the methods of processing by molding and extrusion are disclosed in Kirk-Othmer, ibid., pp. 98–103.

The copolyamides of the invention are characterized by very good transparency, high glass transition temperature and hence high thermal stability, very good workability and hence good mechanical properties such as impact and notch impact strengths. The glass transition temperature is ascertained using Differential Scanning Calorimetry (DSC).

Specific examples of the copolyamides and the mole % of each component, include but are not limited to: 33 mole % lauryl lactam—33 mole % isophthalic acid—20 mole % isophorone diamine—13.4 mole % bis-(4-amino-cyclohexyl)-methane; 28.6 mole % lauryl lactam—35.1 mole % isophthalic acid—25.6 mole % isophorone diamine—10.7 mole % bis-(4-aminocyclohexyl)-methane; 33 mole % lauryl lactam—33 mole % isophthalic acid—20.6 mole % isophorone diamine—13.4 mole % bis-(4-amino-3-methyl-cyclohexyl)-methane; 28.6 mole % lauryl lactam—33.1 mole % isophthalic acid—25.6 mole % isophorone diamine—10.7 mole % 2,2-bis-(4-amino-cyclohexyl)-propane; 25 mole % ω-aminoundecanoic acid—38 mole % isophthalic acid—23 mole % isophorone diamine—14,1 mole % bis-(4-aminocyclohexyl)-methane; 35 mole % lauryl lactam—20,5 mole % isophthalic acid—12 mole % terephthalic acid—20,5 mole % isophorone diamine—12,1 mole % bis-(4-amino-3-methyl-cyclohexyl)-methane.

The present invention is further explained with reference to the following specific examples.

EXAMPLE 1

3.55 kg (18.02 moles) of lauryl lactam; 2.99 kg (18.02 moles) of isophthalic acid; 1.92 kg (11.27 moles) of isophorone diamine; 1.53 kg (7.29 moles) of bis-(4-aminocyclohexyl)-methane; 2.7 kg of fully desalted water and 3.54 g of $H_3PO_4$ are melted in a 20 liter steel autoclave with a spiral agitator under an atmosphere of nitrogen and are heated to 210° to 220° C. under natural pressure (about 20 bars), which sets in. Under these conditions the mixture is precondensed for 3 hours. Then the temperature is raised within an hour to 270° C., the autoclave pressure is being kept to 20 bars by continuous decompression. Polycondensation takes place for 5 hours at the conditions of 270° C. internal temperature and 20 bars pressure. This is followed by slow decompression, heating to 280° to 290° C., and while nitrogen is passed through, polycondensation is carried out to completion in 1 hour. The almost colorless polyamide so obtained is passed through a nozzle into a water bath, where it solidifies into a glass-clear strand which is granulated and dried.

The properties of the polyamide are listed in the table following the specific examples.

EXAMPLE 2

3.19 kg (16.19 moles) of lauryl lactam; 3.29 kg (19.82 moles) of isophthalic acid; 2.46 kg (14.45 moles of isophorone diamine; 1.26 kg (6.0 moles) of bis-(4-aminocyclohexyl)-methane; 2.0 kg of fully desalted water and 3.54 g of $H_3PO_4$ are melted in a nitrogen atmosphere in a 20 liter steel autoclave with a spiral agitator and while stirred are heated to 210° to 220° C. at the natural self-generated pressure (about 20 bars). Under these conditions, the mixture is precondensed for 3 hours. Thereupon the autoclave temperature is raised within one hour to 270° C., the autoclave pressure being kept by means of continuous decompression at 20 bars. With the conditions of internal temperature of 270° C. and a pressure of 20 bars, polycondensation then proceeds for 5 hours. This is followed by slow decompression, heating to 280° to 290° C., and with a flow of nitrogen, polycondensation to completion for 1 hour. The polyamide obtained is nearly colorless and is removed through a nozzle into a water bath where it solidifies in a glass-clear strand which is granulated and dried.

The polyamide properties are listed in the table following the specific examples.

EXAMPLE 3

Example 1 is repeated, with 1.73 kg (7.29 moles) of bis-(4-amino-3-methyl-cyclohexyl)-methane being used in lieu of 1.53 kg (7.29 moles) of bis-(4-amino-cyclohexyl)-methane.

The properties of the transparent polyamide obtained are listed in the table following the specific examples.

EXAMPLE 4

Example 2 is repeated, with 1.43 kg (6 moles) of 2,2-bis-(4-amino-cyclohexyl)-propane being used in lieu of 1.26 kg (6 moles) of bis-(4-amino-cyclohexyl)-methane.

The properties of the transparent polyamide obtained are listed in the table following the specific examples.

COMPARATIVE EXAMPLE A

Example 1 is repeated, with 0.85 kg (7.29 moles) of hexamethylene diamine being used in lieu of 1.53 kg (7.29 moles) of bis-(4-amino-cyclohexyl)-methane.

The properties of the transparent polyamide obtained are listed in the table which follows.

COMPARATIVE EXAMPLE B

Example 2 is repeated, with 0.7 kg (6 moles) of hexamethylenediamine being used in lieu of 1.26 kg (6 moles) of bis-(4-amino-cyclohexyl)-methane.

The properties of the transparent polyamide obtained are listed in the table which follows.

COMPARATIVE EXAMPLE C 3.55 kg (18.02 moles) of lauryl lactam; 2.99 kg (18.02 moles) of isophthalic acid; 3.16 kg (18.56 moles) of isophorone diamine; 2.7 kg of fully desalted water and 3.54 g of $H_3PO_4$ are melted in a nitrogen atmosphere in a 20 liter steel autoclave with spiral agitator and while being stirred are heated to 210° to 220° C. at the natural pressure setting in (about 20 bars). Under these conditions the mixture is precondensed for 3 hours. Thereupon the temperature is raised to 270° C. within one hour, the autoclave pressure being kept at 20 bars by continuous decompression. Under the conditions of a temperature of 270° C. and a pressure of 20 bars, polycondensation is carried out for 5 hours. This is followed by slow decompression, heating to 280° to 290° C., and polycondensation to completion with nitrogen flow. Every 30 minutes a sample of polyamide was removed from the autoclave and its relative solution viscosity was determined in m-cresol at 25° C. (concentration: 0.5 g/100 ml).

| polycondensation time (mins.) | relative solution viscosity | color |
|---|---|---|
| 30 | 1.25 | light yellow |
| 60 | 1.28 | light yellow |
| 90 | 1.30 | light yellow |
| 120 | 1.31 | light yellow |
| 150 | 1.29 | greenish yellow |
| 180 | 1.29 | greenish yellow |
| 210 | 1.28 | yellow |
| 240 | 1.25 | yellow |
| 270 | 1.25 | brown-yellow |
| 300 | 1.23 | brown-yellow |

None of the products can be removed to form a strand, or be granulated.

This comparative example makes it plain that with isophorone diamine as the single diamine component, and even when the time of polycondensation is drastically extended, no high molecular-weight transparent polyamides can be prepared.

| | mole % | | | | | Tg °C. (+) glass transition temperature | Impact strength DIN 53433 | Notch Impact Strength DIN 54453 (kg/m²) |
|---|---|---|---|---|---|---|---|---|
| | TPS/IPS | IPD | Diamine | Lactam | ηrel | | | |
| Example | | | | | | | | |
| 1 | 33.0 | 13.4 | 20.6 | 33.0 | 1.61 | 149 | no fracture | 6.1 |
| 2 | 35.1 | 25.6 | 10.7 | 28.6 | 1.65 | 159 | no fracture | 6.5 |
| 3 | 33.0 | 13.4 | 20.6 | 33.0 | 1.68 | 158 | no fracture | 5.8 |
| 4 | 35,1 | 25,6 | 10,7 | 28,6 | 1.59 | 161 | no fracture | 5.7 |
| Comparative Examples | | | | | | | | |
| A | 33.0 | 13.4 | 20.6 | 33.0 | 1.64 | 106 | no fracture | 4.1 |
| B | 35.1 | 25.6 | 10.7 | 28.6 | 1.66 | 128 | no fracture | 4.6 |
| C | 33.0 | 34.0 | — | 33.0 | 1.23 | 147 | not processable | |

(+) Glass transition temperature is ascertained by Differential Scanning Calorimetry (DSC).

I claim:

1. In a transparent, high molecular weight copolyamide having a high glass transition temperature, based on:
   (1) a lactam or an omega-aminocarboxylic acid;
   (2) terephthalic acid, isophthalic acid, or mixtures thereof; and
   (3) a mixture of diamines; the improvement wherein said copolyamide consists essentially of the polymeric reaction product of
   (A) about 25 to 60 mole % of at least one omegaaminocarboxylic acid having at least 11 C atoms in a continuous chain or its lactam;
   (B) about 40 to 75 mole % of an equivalent mixture of terephthalic acid, isophthalic acid or a mixture thereof, and a diamine mixture of about 80 to 50 mole % referred to the total diamine mixture, of isophorone diamine and correspondingly about 20 to 50 mole % of diamines having the general formula

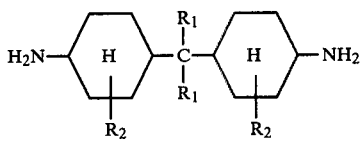

where $R_1$ and $R_2$ are hydrogen atoms or alkyl groups having 1 to 4 C atoms and the sum of A+B amounts to 100 mole %.

2. Transparent high molecular weight copolyamide having a high glass transition temperature, consisting of the polymeric condensation product of (A) 30 to 50 mole % of at least one omega-aminocarboxylic acid having at least 11 C atoms in a continuous chain or its lactam;

(B) 50 to 70 mole % of an equivalent mixture of terephthalic acid, isophthalic acid or a mixture thereof, and a diamine mixture of 80 to 50 mole %, referred to the total diamine mixture, of isophorone diamine and correspondingly 20 to 50 mole % of diamines having the general formula

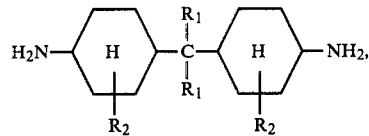

where $R_1$ and $R_2$ are hydrogen atoms or alkyl groups having 1 to 4 C atoms and the sum of A+B amounts to 100 mole %.

3. Transparent, impact resistant molded article made from the copolyamide of claim 1.

4. Transparent, impact resistant molded article made from the copolyamide of claim 2.

5. The transparent, high molecular weight copolyamide of claim 2, wherein said omega-aminocarboxylic acid is selected from the group consisting of aminoundecanoic acid and aminododecanoic acid and said lactam is lauryl lactam.

6. The transparent, high molecular weight copolyamide of claim 5, wherein said isophorone diamine is an isomeric mixture of 3-aminomethyl-3,5,5-trimethylcyclohexylamine.

7. The transparent, high molecular weight copolyamide of claim 6, wherein said diamines having the general formula are selected from the group consisting of bis-(4-aminocyclohexyl)-methane; bis-(4-amino-3-methyl-cyclohexyl)-methane; 2,2-bis-(4-aminocyclohexyl)-propane; 2,2-bis-(4-aminocyclohexyl)-methane and bis-(4-amino-3-methyl-cyclohexyl)-methane.

8. The transparent, high molecular weight copolyamide of claim 7, having a relative solution viscosity between about 1.5 and 1.8 as measured in a 0.5% solution of said polyamide in m-cresol at 25° C.

* * * * *